(12) United States Patent
Damera-Venkata

(10) Patent No.: US 8,363,282 B2
(45) Date of Patent: Jan. 29, 2013

(54) HALFTONE SCREENING AND BITMAP BASED ENCODING OF INFORMATION IN IMAGES

(75) Inventor: Niranjan Damera-Venkata, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3149 days.

(21) Appl. No.: 10/698,899

(22) Filed: Oct. 31, 2003

(65) Prior Publication Data

US 2005/0094844 A1  May 5, 2005

(51) Int. Cl.
*H04N 1/40* (2006.01)
*G06K 9/00* (2006.01)

(52) U.S. Cl. ............ 358/3.28; 358/3.04; 358/3.05; 358/3.07; 358/3.2; 358/534; 358/535; 358/536; 358/539; 382/100; 382/166; 382/173; 382/190; 382/232; 382/233; 382/237

(58) Field of Classification Search .......... 358/3.28, 358/3.2, 2.04, 3.05, 3.06, 3, 534, 535, 536, 358/537, 3.04, 3.07, 639; 382/100, 232, 382/173, 273, 237, 190, 233
See application file for complete search history.

(56) References Cited

U.S. PATENT DOCUMENTS

| | | | |
|---|---|---|---|
| 5,315,098 A | | 5/1994 | Tow |
| 5,337,361 A | * | 8/1994 | Wang et al. ............... 380/51 |
| 5,710,636 A | * | 1/1998 | Curry ..................... 358/3.28 |
| 5,778,102 A | * | 7/1998 | Sandford et al. .......... 382/251 |
| 5,818,032 A | | 10/1998 | Sun et al. |
| 5,946,414 A | | 8/1999 | Cass et al. |
| 6,000,613 A | | 12/1999 | Hecht et al. |
| 6,141,441 A | | 10/2000 | Cass et al. |
| 6,252,971 B1 | * | 6/2001 | Wang ..................... 382/100 |
| 6,512,596 B1 | * | 1/2003 | Lapstun ................... 358/1.9 |
| 6,606,421 B1 | | 8/2003 | Shaked et al. |
| 6,655,592 B2 | | 12/2003 | Shaked et al. |
| 6,700,992 B1 | | 3/2004 | Yu et al. |
| 6,751,352 B1 | | 6/2004 | Baharav et al. |
| 6,915,020 B2 | | 7/2005 | Damera-Venkata et al. |
| 7,218,420 B1 | * | 5/2007 | Tai et al. .................. 358/3.2 |
| 2002/0186884 A1 | | 12/2002 | Shaked et al. |
| 2002/0196979 A1 | | 12/2002 | Yen et al. |

(Continued)

FOREIGN PATENT DOCUMENTS

| | | |
|---|---|---|
| EP | 0493053 | 7/1992 |
| EP | 1158456 | 11/2001 |

OTHER PUBLICATIONS

Wong et al., "Image processing for halftones." IEEE Signal processing magazine, 1053-5888/03, pp. 59-70 (Jul. 2003).

(Continued)

*Primary Examiner* — Steven Kau

(57) ABSTRACT

A method of processing a continuous tone image includes using a halftone screen to generate a bi-level bitmap; partitioning the contone image into an array of image blocks; halftoning the image blocks; using the bi-level bitmap to select some of the halftone image blocks; and modifying the selected halftone image blocks using code words, such that information contained in the code words is embedded in a halftone image. A method of extracting embedded information in a halftone image includes accessing a bi-level bit map; partitioning the halftone image into a plurality of image blocks; using the bitmap to select at least some of the blocks; identifying a code word sequence in the selected blocks; and extracting the information from the code word sequence.

38 Claims, 5 Drawing Sheets

U.S. PATENT DOCUMENTS

| | | |
|---|---|---|
| 2003/0038181 A1 | 2/2003 | Damera-Venkata et al. |
| 2003/0047612 A1 | 3/2003 | Shaked et al. |
| 2003/0112471 A1 | 6/2003 | Damera-Venkata et al. |
| 2003/0174857 A1* | 9/2003 | Yu ................................ 382/100 |
| 2004/0071311 A1* | 4/2004 | Choi et al. ..................... 382/100 |

OTHER PUBLICATIONS

N. Damera-Venkata and B. L. Evans, "FM Halftoning Via Block Error Diffusion," Proc. IEEE Int'l Conf on Image Proc, vol. II, pp. 1081-1084, Thessaloniki, Greece (2001).

Zhigang Fan, "Dot-to-dot error diffusion," Journal of Electronic Imaging, vol. 2 (1) (Jan. 1993).

Niranjan Damera-Venkata et al: "Adaptive Threshold Modulation for Error Diffusion Halftoning" IEEE Trans Image Proc.,New York, US vol. 10 No. 1, pp. 104-116 (2001).

J. Allebach and Q. Lin, "FM screen design using the DBS algorithm", Proceedings of 3rd IEEE International Conference on Image Processing, vol. 1, pp. 549-552, Sep. 1996.

N. Damera-Venkata et al., "Image barcodes," Proc. SPIE [online] vol. 5008, pp. 493-503, USA, Jan. 21, 2003.

Ming Sun Fu et al., "Data hiding in ordered dithered halftone images" Circuits, Systems, and Signal Processing, [online] vol. 20, No. 2, pp. 209-232, Boston, Mar. 2001.

\* cited by examiner

HALFTONE SCREENING AND BITMAP BASED ENCODING OF INFORMATION IN IMAGES

BACKGROUND

It is often useful to embed information within an image such that the information is not noticeable to a person viewing the image. There are practical applications for embedding information within the image. Security is one example. Embedding information representing the name of an employee and his or her social security number within the employee's identification photograph can not only add a level of security to the information but also can correlate the embedded information with the visual data. In many applications, it is also useful to reproduce an image with embedded information onto a printed, tangible medium for viewing, archiving, or transmission to others.

Certain embedding techniques feature the ability to store sizable amounts of information. However, these techniques have several requirements, including that the base image used during the embedding process be known, or at least approximated, for optimal information extraction. Thus these techniques are not "blind."

Robust and efficient blind decoding of images with embedded information is desirable.

SUMMARY

According to one aspect of the present invention, a method of processing a continuous tone image includes using a halftone screen to generate a bi-level bitmap; partitioning the contone image into an array of image blocks; halftoning the image blocks; using the bi-level bitmap to select some of the halftone image blocks; and modifying the selected halftone image blocks using code words, such that information contained in the code words is embedded in a halftone image.

According to another aspect of the present invention, a method of extracting embedded information in a halftone image includes accessing a bi-level bit map; partitioning the halftone image into a plurality of image blocks; using the bitmap to select at least some of the blocks; identifying a code word sequence in the selected blocks; and extracting the information from the code word sequence.

Other aspects and advantages of the present invention will become apparent from the following detailed description, taken in conjunction with the accompanying drawings, illustrating by way of example the principles of the present invention.

DETAILED DESCRIPTION

Figure 1:
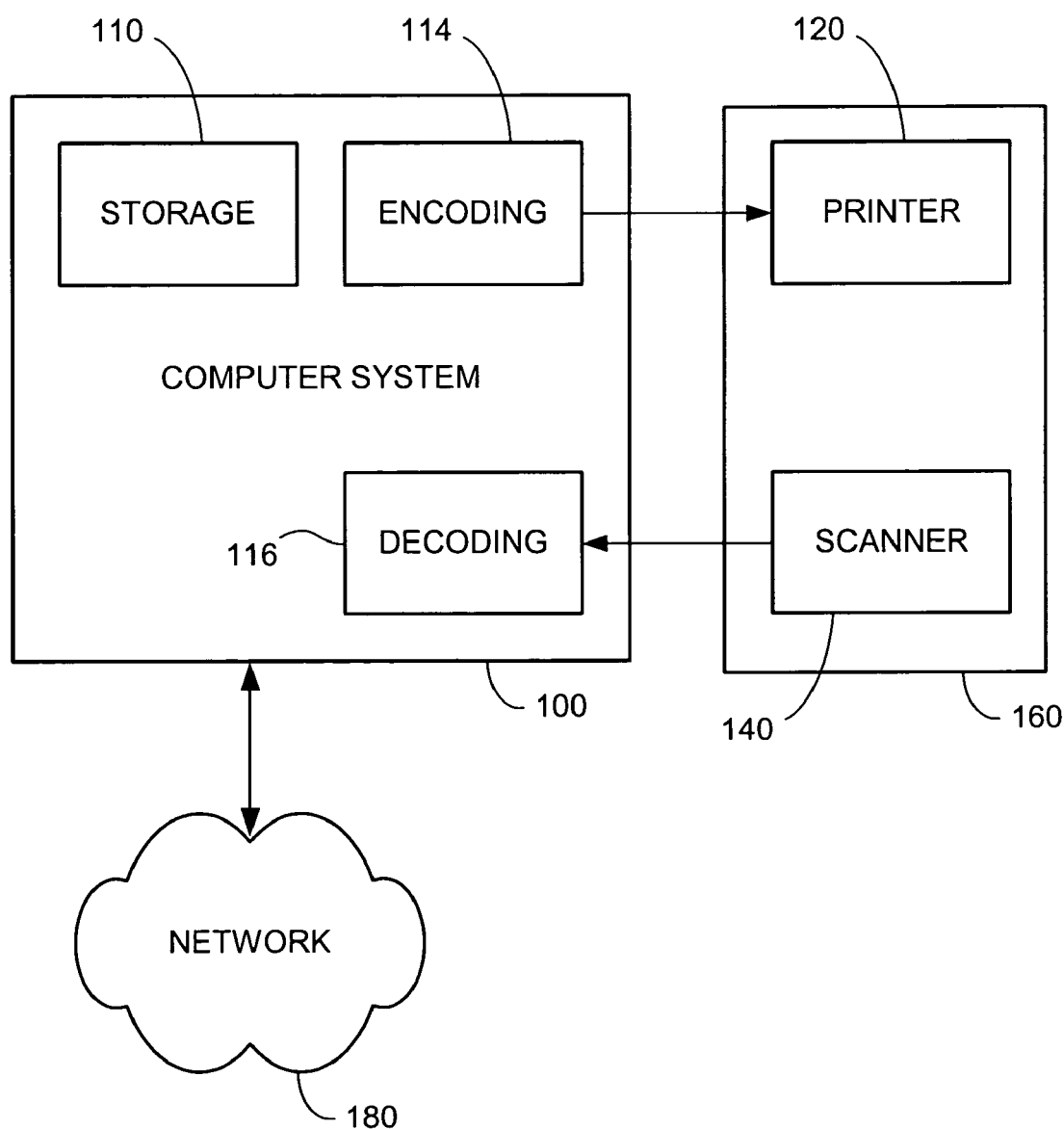
FIG. 1 is a functional block diagram of a computer system in accordance with an embodiment of the present invention.

As shown in the drawings for purposes of illustration, the present invention is embodied in a method of processing a continuous tone image. The method includes using a halftone screen to generate a bi-level bitmap; partitioning the contone image into an array of image blocks; halftoning the image blocks; using the bi-level bitmap to select some of the halftone image blocks; and modifying the selected halftone image blocks using code words, such that information contained in the code words is embedded in a halftone image. The information may be embedded at a rate that is linked to a graylevel of a contone patch. The bitmap may be produced by halftoning the constant patch of the graylevel. The graylevel is determined by a coding rate.

The present invention is also embodied in a method of extracting embedded information in a halftone image. The method includes accessing a bi-level bit map; partitioning the halftone image into a plurality of image blocks; using the bitmap to select at least some of the blocks; identifying a code word sequence in the selected blocks; and extracting the information from the code word sequence.

The information embedding can be performed by an encoder, and the information extraction can be performed by a decoder. The decoding is blind, in that the base image used during the embedding is not needed to extract the embedded information.

The decoding is robust. The embedded information can be extracted from an image that went through a printer-scanner pipeline (e.g., the image with the embedded information was halftoned and printed, and the printed image was scanned).

Referring to FIG. 1, computer system 100 executes encoding process 114, which embeds information into an input image, stores the resultant image in storage 110, and/or transmits the resultant image via network 180. Network 180 may be, for example, a local area network, wide area network, or a distributed network such as the Internet. Transmission may be followed by remote file storage of the image, or sending the image (e.g., via e-mail) to a different system.

The resultant image with the embedded information can be output by a printer 120. Printer 120 may be, for example, a laser printer or an ink jet printer.

The printed image may be converted to a digital image by a scanner 140. The scanner 140 and the printer 120 form a printer-scanner pipeline 160.

Computer system 100 or another system may execute decoding process 116 to extract the information embedded in the digital image. Encoding process 114 may be separate from the decoding process 116, encoding process 114 may be executed by one or more systems, and decoding process 116 may be executed by one or more systems which are different or the same as the system or systems that execute the encoding process 114.

Decoding process 116 may receive the digital image directly from the scanner 140. Instead of retrieving the digital image directly from the scanner 140, the image may be retrieved from storage 110, or received via network 180. In general, the source of the image to be decoded is not limiting to the present invention.

Encoding process 114 and decoding process 116 are preferably implemented as software or firmware, but in alternative embodiments may be implemented in hardware, e.g., in custom ASICs or dedicated processors.

Figure 2A:
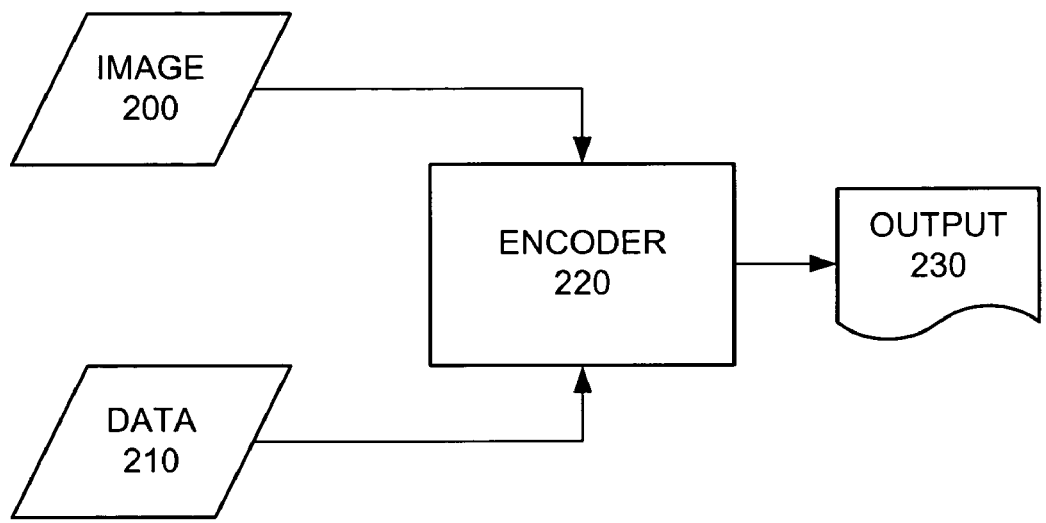
FIG. 2A is a flowchart of an information embedding method in accordance with an embodiment of the present invention.

FIG. 2A provides further detail of the encoding process 114 executed by encoder 220. As can be seen, a continuous tone image 200 is input into encoder 220. Encoder 220 also accepts input of data 210, which will be embedded into image 200. Encoder 220 further has stored, or accepts, an encoding rate value, which determines the embedding rate of data 210 within input image 200. Output 230 of encoder 220 is a modified version of input image 200 (i.e., modified image data) that can be viewed with appropriate viewing software, such as that provided by default with major computer operating systems printed, or otherwise displayed. Output 230 may also be stored in local storage and/or on a remote file server, or transmitted to one or more other systems over a network, via e-mail for example.

Figure 2B:
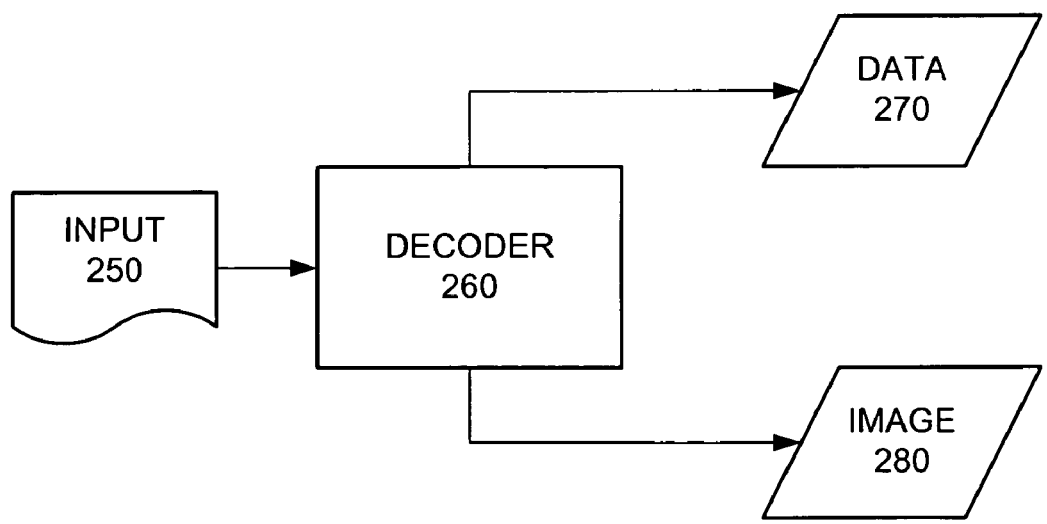
FIG. 2B is a flowchart of an information extraction method in accordance with an embodiment of the present invention.

The decoding process is shown in FIG. 2B. As can be seen, an input image 250 is supplied to decoder 260. Input image 250 can be obtained from a scanner, local storage, or a network, or from any other source. Input image 250 is fed into decoder 260, where it is analyzed, and the information embedded in the input image 250 extracted and produced as data 270. In one embodiment, decoder 260 also produces the original image used to create the modified image during a previous encoding process.

Figure 3:
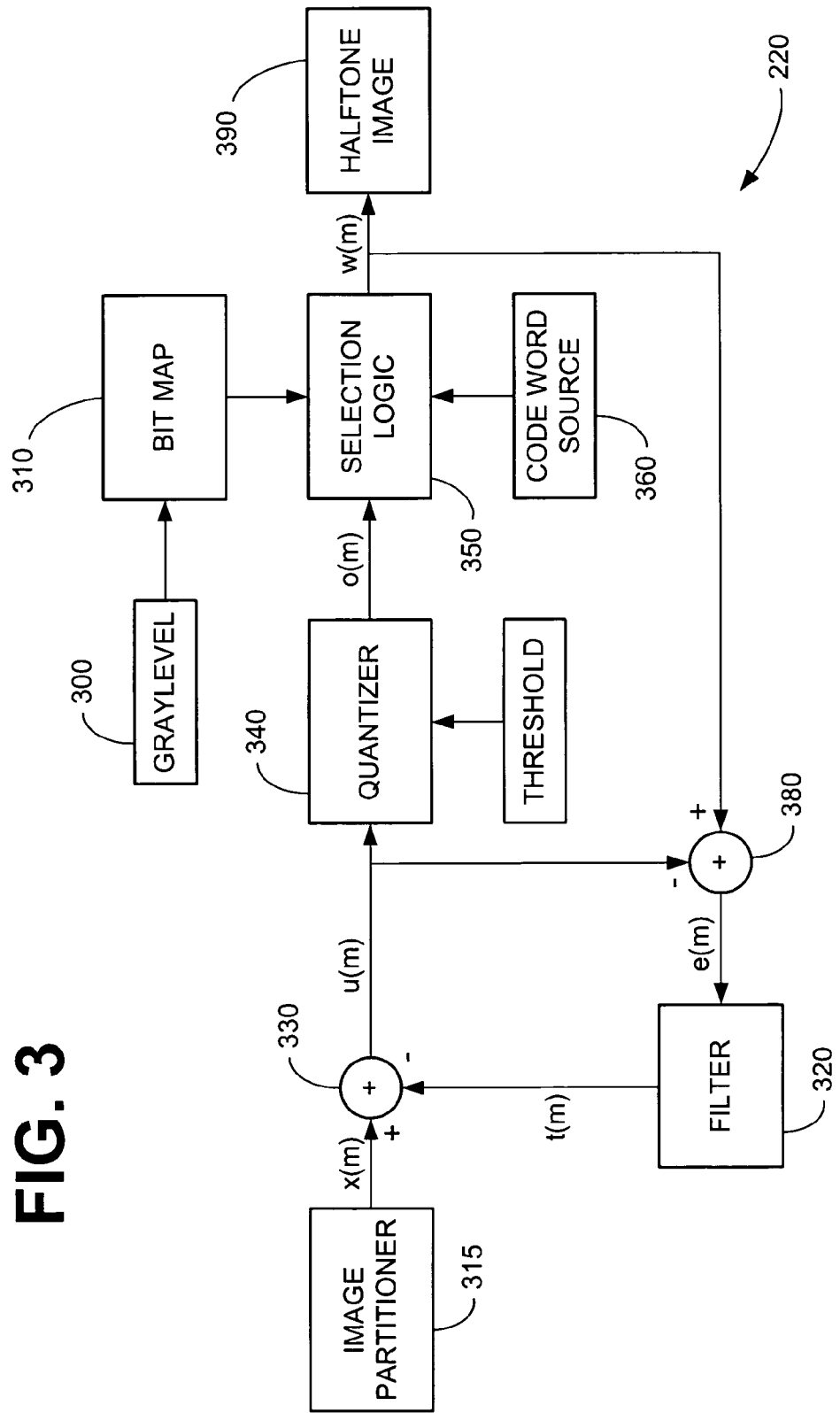
FIG. 3 is a flowchart of an encoder in accordance with an embodiment of the present invention.

FIG. 3 presents a more detailed view of one embodiment of encoder 220, including a halftone gray level bitmap generator, halftoning and error diffusion processes, and information embedding logic, as will be explained.

A halftone gray level parameter 300, which is indicative of a selected encoding rate for the embedded information, is used to generate a halftone bitmap 310 consisting of binary data, composed of zeros and ones. This bitmap generation may be performed by any suitable halftoning technique, such as block error diffusion or halftone screening (dithering), for example. See J. Allebach and Q. Lin, "FM screen design using the DBS algorithm", Proceedings of 3rd IEEE International Conference on Image Processing, vol. 1, pp. 549-552, September 1996. In one embodiment, such a halftone bitmap 310 is composed of aperiodic data and designed to achieve the highest possible spatial frequency. Such a bitmap composition is one way to minimize the visual impact of the embedded information.

In an alternative embodiment, halftone bitmap 310 can be retrieved using halftone gray level parameter 300 as an index into a table of pre-generated binary bitmaps. The zeros and ones in binary halftone bitmap 310 indicate where information will be embedded. The dimensions of halftone bitmap 310 are application or user selectable, and need not have any relation to the dimensions of the input image 250.

The value of halftone gray level parameter 300 is based on the combination of the desired modified image quality level and the amount of information to be embedded in the image. In general, information capacity of the modified image may be traded for image quality in a smooth manner by appropriate adjustment of the value of halftone gray level parameter 300. A smaller value of halftone gray level parameter 300 results in a lower information embedding rate and therefore higher visual quality of the modified image, while a larger value of halftone gray level parameter 300 results in a higher information embedding rate, and a reduced visual quality of the modified image. For a particular application, such as a corporate ID photo, a particular value of halftone gray level parameter 300 may be selected, and then set as a constant within encoder 220. For other applications, the value of halftone gray level parameter 300 may be varied interactively until a satisfactory blend of information embedding rate and image quality is achieved.

Image partitioner 315 partitions original image 200 into a plurality of sub-matrices (or sub-images). For example, if original image 200 is an M×N pixel image, it may be partitioned into a regular array of O K×K pixel sub-matrices, where O=M×N/(K×K). Optionally, one or more original image sub-matrices may be reserved for fiducial marks, and would be separately assembled into encoded halftone image 390. A fiducial mark pattern could be used to track one or more reference locations and local deformation across the resulting graphical bar code, for example, in a manner described in U.S. Patent Application No. 20020186884 by Doron Shaked et al., published Dec. 12, 2002 and entitled "Fiducial Mark Patterns for Graphical Bar Codes."

The unprocessed sub-matrices (x(m)) of original image 200 are optionally passed through difference stage 330, which incorporates diffused errors t(m) into the original image blocks x(m) to produce modified image blocks u(m). The modified image blocks u(m) are quantized at a thresholding stage 340 to generate blocks o(m), which are halftone versions of x(m). In particular, at the threshold stage 102, each modified image block u(m) is assigned a respective representative quantized block that is selected from a subset of possible representative halftone blocks (or regions). For example, in one embodiment, each modified image block u(m) may be represented either by an all-bright pixel block (i.e., a block with all pixels equal to maximum intensity) or an all-dark pixel block (i.e., a block with all pixels equal to lowest intensity).

Code words are generated by a code word sequence generator 360 from embedded data 210. In one embodiment, this merely involves using embedded data 210 directly, bit by bit. In another embodiment, error checking coding is added to embedded data 210 first, before being converted to code words. In yet another embodiment, data 210 is compressed before being translated into code words by a code word sequence generator 360. The code word sequence generator 360 utilizes the incoming data to produce graphical symbols which correspond to the code words. At logic stage 350, when a bit from halftone bitmap 310 corresponding to the spatial location of halftone image data o(m) is b(m)=1, then a symbol corresponding to a code word is generated and the output is set to that symbol. More than one symbol may be used to represent a single code word as long as the code word is uniquely encodable from the symbol alone. The output from logic stage 350 is assembled into encoded halftone image 390, which corresponds to output 230.

Halftone bitmap 310 need not be the same size or larger than input image 200. Halftone bitmap 310 may in fact typically be smaller than input image 200, and as it is traversed during logic stage 350, when an edge of the bitmap is reached, will simply wrap back to the start of the opposite edge, akin to a tiling process.

In one embodiment, logic stage 350 may also contain additional logic that causes the test of b(m) to be skipped when the input block x(m) meets certain requirements, such as meeting certain minimum or maximum intensity thresholds, whereby the modified input image block is passed through to the output of logic stage 350. This may be done to improve the visual quality of the resultant encoded halftone image, as well as to reduce the accumulation of quantization errors in the resultant halftone image which occur when the code word block symbols are significantly different from the modified input image blocks in terms of average intensity value.

Optionally, errors introduced by logic stage 350 into the halftone image 390 as a result of the information embedding process are fed back via computer error computation stage 380 to shape error filter 320 such that the error t(m) can be diffused among the as yet unprocessed, unreserved sub-matrices. This error diffusion assists in improving the image quality of the halftone image 390 containing the embedded information, but in some applications, such error diffusion will not be necessary.

At error computation stage 380, quantization errors e(m) are computed based upon differences between the blocks u(m) of the modified image and the corresponding block output from logic stage 350. The quantization errors e(m) are filtered by a linear shape error filter 320 to produce the diffused errors t(m). In one embodiment, the linear error filter 320 has matrix valued coefficients and operates on the quantization error sequence e(m) to produce the feedback signal sequence t(m) according to:

$$t(m) = \sum_{k \in S} \check{h}(k) e(m-k) \quad (1)$$

where $\check{h}(\cdot)$ is an $N^2 \times N^2$ matrix-valued sequence and S is the filter support. The shape error filter 320 preferably is designed so that the diffused error is invariant to the specific message code word bit pattern at a given block. In the illustrated embodiment, the shape error filter 320 is configured to diffuse the average error. Additional details regarding the block error diffusion process may be obtained from U.S. Patent Application No. 2003/0038181, by the inventor, and entitled "System and Method for Embedding Information within a Printed Image Using Block Error Diffusion Halftoning," which is incorporated herein by reference. Additional details can also be found in N. Damera-Venkata and B. L. Evans, "FM Halftoning Via Block Error Diffusion," Proc. IEEE International Conference on Image Processing, vol. II, pp. 1081-1084, Thessaloniki, Greece (2001).

As an example, if a 1×1 block size is used by image partitioner 315 then the encoding process is tantamount to performing normal error diffusion. In other words, at the locations where b(m)=1, the output is determined directly by the code word 360. If a code word with a value of 1 is used then the output is set to 1. If a code word with a value of 0 is used then it is set to 0. The error between the past-error modified input and the output is then diffused. The halftone bitmap 310 thus acts as a threshold modulation matrix. However, at the embedding locations the information may be embedded at a lower resolution (using 2×2 blocks, for example) and the rest of the locations may be halftoned at a higher resolution (with 1×1 blocks, for example). This improves image quality and increases the average resolution above the typical bound for decodability.

Figure 4:
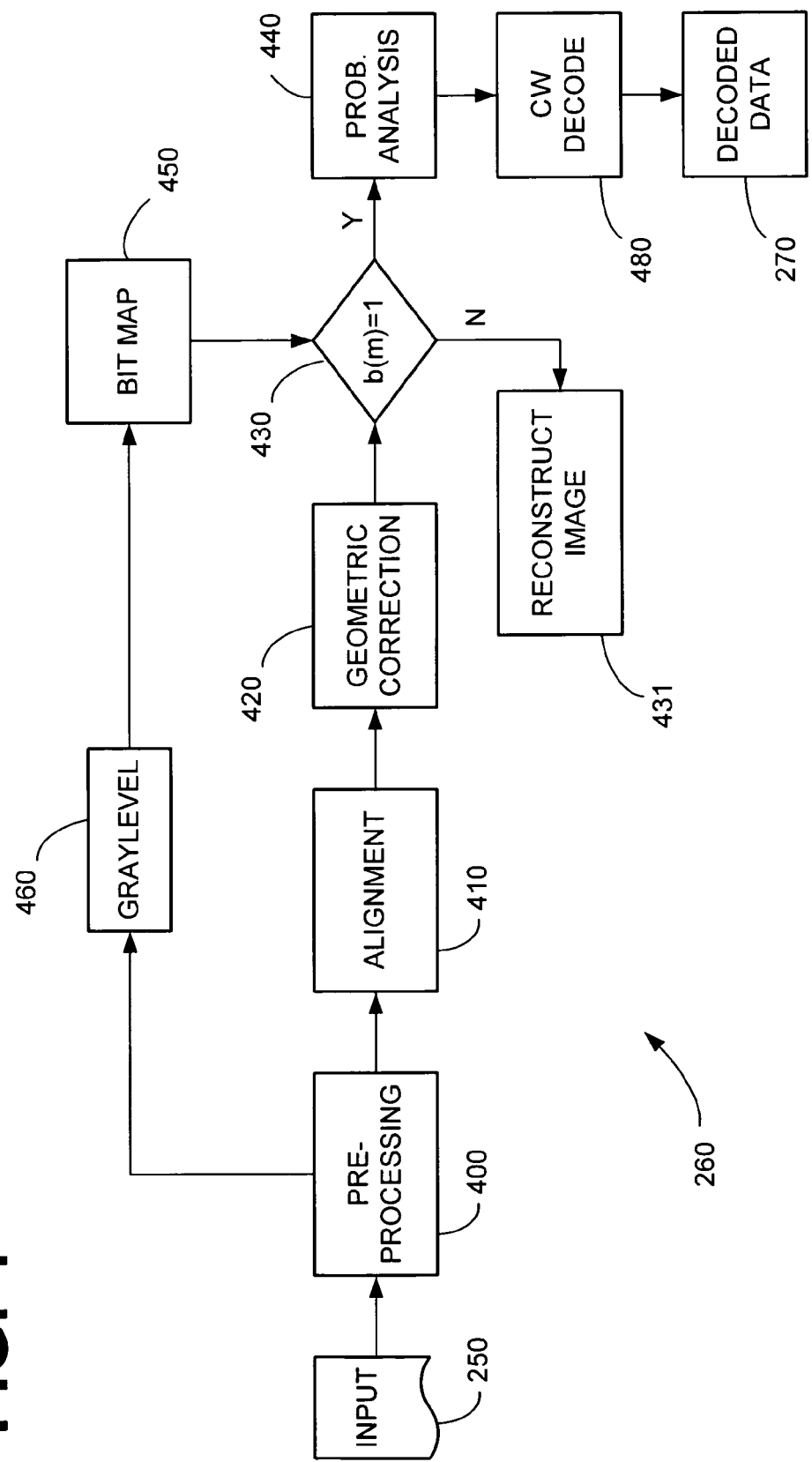
FIG. 4 is a flowchart of a decoder in accordance with an embodiment of the present invention.

FIG. 4 presents a more detailed view of decoder 260. In general, decoder 260 includes a pre-processing stage 400, an alignment stage 410, a geometric correction stage 420, a code word extraction stage 430, an optional probabilistic analysis stage 440, and a code word decoding and output stage 480. The code word decoding and output stage 480 produces decoded data 270.

During the pre-processing stage 400, an input modified image is analyzed to locate the position of embedded information, and regions not containing information may be cropped and trimmed from input 250, e.g., in a manner described in U.S. Patent Application 20020196979 by Jonathan Yen et al., published Dec. 26, 2002 and entitled "Automatically Extracting Graphical Bar Codes."

During the alignment stage 410, fiducial marks are detected in the pre-processed image. The configuration of the detected fiducial marks indicates the type of global deformations that might have been introduced into the graphical bar code during transmission of the input image, e.g. photocopying of the originally printed modified image, followed by scanning to produce input image 250. These global deformations (e.g., translational, rotational, affine and skew distortions) may be corrected by geometric correction stage 420, in a manner described in assignee's U.S. Pat. No. 6,606,421 by Doron Shaked et al., issued Apr. 12, 2003 and entitled "Geometric Deformation Correction Method and System for Dot Pattern Images."

Once an aligned, geometrically corrected image is produced, it is processed through code word extraction stage 430. Halftone decoder 430 also accepts input from binary halftone bitmap 450. Binary halftone bitmap is generated at the same encoding rate used to embed the information during the encoding process for the image being processed. The encoding rate, which is determined by the selected value of the halftone gray level parameter 460, can either be a constant based on the type of image being processed (e.g. driver license pictures might use a predetermined encoding rate), or dynamically determined using any one of a variety of different possible methods. For example, particular image data may be included in a predetermined portion of the input image (e.g. a one dimensional barcode), where such data is a code indicating the value of the gray level parameter 460 to use. An alternate method includes an heuristic process whereby the method is iterated over a range of values of the gray level parameter 460 until a certain data signature is found in the decoded data, at which point the value of the gray level parameter 460 used to ascertain that signature is used to decode the rest of the image. As another example, a fixed encoding rate is used for a particular portion of each image, wherein that portion contains embedded information that can be easily decoded since the encoding rate for that portion is known. Of course, other known methods of determining codes, signatures, and ciphers can be used as well.

As with the encoding process, logic stage 350 uses the binary bitmap 450 to determine where in an image embedded information is stored. The input image is partitioned into sub-matrices. The sub-matrix block size may either be a constant based on the application, or determined dynamically via methods similar to those described for determination of the value of halftone gray level 460.

In code word extraction stage 430, each relative bit of binary bitmap 450 is tested to see if it is a data indicator bit (e.g. value of 1) or an image indicator bit (e.g. value of 0). If it is an image indicator bit, the related sub-matrix of the aligned and corrected input image 250 is ignored or used to reconstruct the image (431); if it is a data indicator bit, then the image sub-matrix is passed to probabilistic analysis stage 440. In one embodiment, code word extraction stage 430 may also contain additional logic that causes the test of b(m) from bitmap 450 to be skipped when the input block meets certain requirements, such as meeting certain minimum or maximum intensity thresholds, whereby the modified input image block is simply ignored as it is known to not be a data block.

During the probabilistic analysis stage 440, in one embodiment, probability models are applied to the extracted pixel values obtained from the aligned and geometrically corrected image to produce a set of probability parameters. The probability parameters may be used during the code word decoding stage 480 to select the most likely sequence of graphical code words that corresponds to the graphical code word sequence that originally was encoded into original image 250, e.g., in a manner described in U.S. Patent Application 20030047612 by Doron Shaked et al., published on Mar. 13, 2003 and entitled "Generating and Decoding Graphical Bar Codes." The selected graphical code word sequence is translated into an encoded message that is decoded into decoded data 270 by the code word decoding stage 480. Error correction codes in the data can be used to ensure accuracy of the decoded data.

Figure 5:
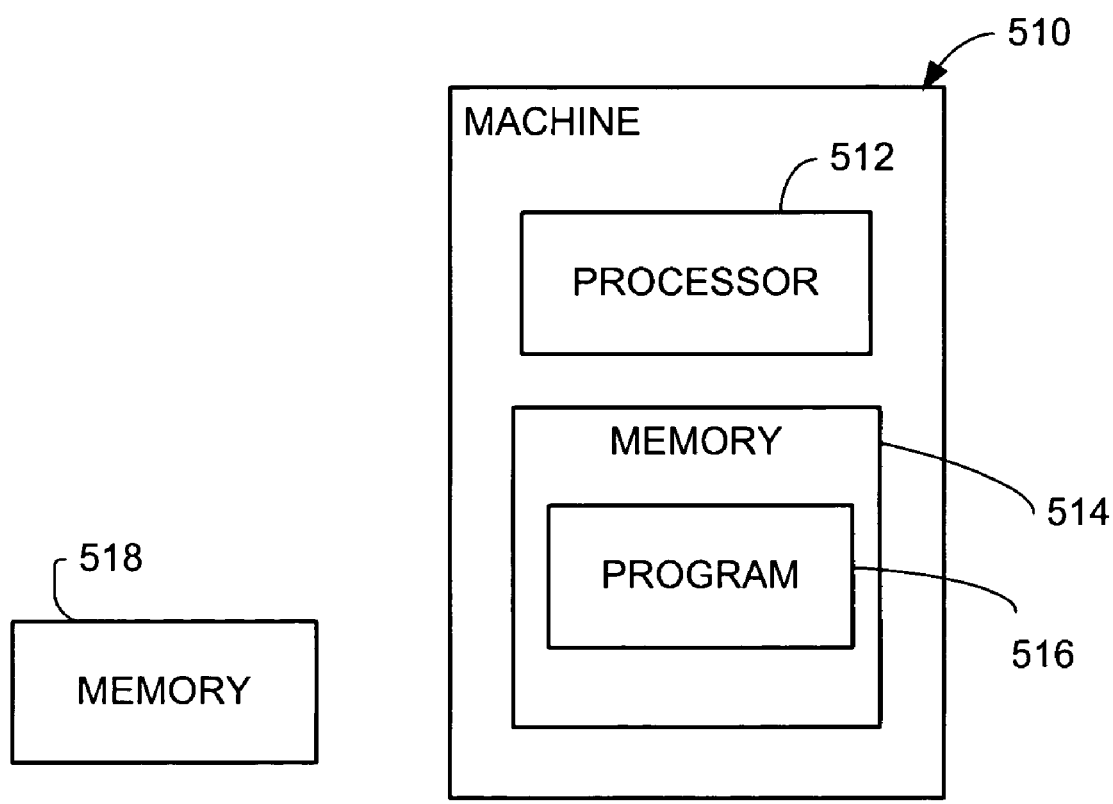
FIG. 5 is an illustration of a machine in accordance with an embodiment of the present invention.

Reference is now made to FIG. 5. A machine 510 includes a processor 512 and memory 514. The machine 510 may be a personal computer, wherein the processor 512 is general purpose processor. A program 516, when executed, causes the processor 512 to perform any of the methods described herein. The program 516 can be stored in "articles" such as the memory 514. During distribution, the program 516 can be stored in articles such as external removable media (e.g., optical discs) 518, etc.

The machine 510 may include a print engine, and the processor 512 and memory 514 are used to embed information in a halftone image. The machine 510 may include a scan engine, and the processor 512 and memory are used to extract information from a captured digital image and output both the captured image and the extracted information.

The encoding and decoding can be performed with any size input image (i.e. an image of any arbitrary dimension). Variable resolution encoding allows for overall greater image quality.

While the embodiments disclosed above relate to grayscale images, color images can be used instead of grayscale images, allowing for separately encoded information in each color component or embedding information in just one color component.

Although specific embodiments of the present invention have been described and illustrated, the present invention is not limited to the specific forms or arrangements of parts so described and illustrated. Instead, the present invention is construed according to the following claims.

What is claimed is:

1. A method of processing a contone image, the method comprising:
   determining a bi-level bitmap of bits from a graylevel value, wherein each of the bits has a respective one of either a first value or a second value;
   partitioning the contone image into an array of contone image blocks;
   generating a sequence of graphical code word symbols encoding information; and
   producing blocks of an output halftone image from ones of the contone image blocks and ones of the graphical code word symbols in accordance with the values of respective ones of the bits of the bi-level bitmap, wherein ones of the output halftone image blocks associated with respective ones of the bits having the first value are derived from respective ones of the contone image blocks and ones of the output halftone image blocks associated with respective ones of the bits having the second value are derived from respective ones of the graphical code word symbols.

2. The method of claim 1, wherein the determining comprises determining the bitmap based on the graylevel value.

3. The method of claim 2, wherein the determining comprises producing the bitmap by halftoning a contone patch of the graylevel value.

4. The method of claim 1, wherein the determining comprises selecting the bitmap from a set of bi-level bitmaps.

5. The method of claim 1, wherein the producing comprises producing the output halftone image blocks with a dimension that is different from a corresponding dimension of the respective ones of the contone image blocks.

6. The method of claim 1, wherein the sequence of graphical code word symbols corresponds to a graphical bar code.

7. The method of claim 1, wherein the producing comprises halftoning the contone image blocks, and
   determining whether to derive ones of the output halftone image blocks from either respective ones of the contone image blocks or respective ones of the graphical code word symbols based on image intensity levels in the respective ones of the contone image blocks.

8. The method of claim 7, wherein the halftoning comprises error diffusion halftoning the contone image blocks.

9. The method of claim 1, further comprising diffusing error values determined from the output halftone image blocks.

10. Apparatus for performing the method of claim 1.

11. An article comprising non-transitory memory encoded with a program for causing a processor to perform the method of claim 1.

12. A method of extracting information embedded in a halftone image, the method comprising:
    accessing a bi-level bit map;
    partitioning the halftone image into a plurality of image blocks;
    using the bitmap to select at least some of the blocks;
    identifying a code word sequence in the selected blocks; and
    extracting the information from the code word sequence.

13. The method of claim 12, wherein the using comprises selecting ones of the image blocks at a rate that is linked to a graylevel of the halftone image.

14. The method of claim 12, wherein the accessing comprises selecting the bitmap from a table of different bi-level bitmaps.

15. The method of claim 14, wherein the accessing comprises using a gray level value as an index into the table of the different bi-level bitmaps.

16. The method of claim 12, wherein the using comprises determining which of the image blocks to select based on image intensity levels of the image blocks.

17. The method of claim 12, further comprising using unselected ones of the image blocks to construct a version of the halftone image free of the embedded information.

18. The method of claim 12, wherein the extracting comprises using probabilistic analysis to produce a set of probability parameters, using the set of probability parameters to select a likely sequence of graphical code word symbols encoded into the halftone image, and converting the selected sequence of graphical code word symbols into the extracted information.

19. Apparatus for performing the method of claim 12.

20. An article comprising non-transitory memory encoded with a data for causing a processor to perform the method of claim 12.

21. Apparatus comprising one of an encoder for encoding a contone image and a decoder for decoding a halftone image;
    the encoder being operable to perform operations comprising
        determining a first bi-level bitmap of bits from a graylevel value, wherein each of the bits has a respective one of either a first value or a second value,
        partitioning the contone image into an array of contone image blocks,
        generating a first sequence of graphical code word symbols encoding information, and
        producing blocks of an output halftone image from ones of the contone image blocks and ones of the graphical code word symbols in accordance with the values of respective ones of the bits of the bi-level bitmap, wherein ones of the output halftone image blocks associated with respective ones of the bits having the first value are derived from respective ones of the contone image blocks and ones of the output halftone image blocks associated with respective ones of the bits having the second value are derived from respective ones of the graphical code word symbols; and the decoder being operable to perform operations comprising determining a second bi-level bit map of bits from a graylevel value, wherein each of the bits of the second bi-level bit map has a respective one of two different values, partitioning a version of the output halftone image into a plurality of partitioned halftone image blocks, selecting ones of the partitioned halftone image blocks in accordance with the values of respective ones of the bits of the second bitmap, identifying a second sequence of graphical code word symbols from the selected ones of the partitioned halftone image blocks, and extracting information from the second sequence of graphical code word symbols.

22. The apparatus of claim 21, wherein the encoder determines the first bi-level bitmap based on the graylevel value characterizing the first bi-level bitmap.

23. The apparatus of claim 22, wherein the encoder produces the bitmap by halftoning a contone patch of the graylevel value characterizing the first bi-level bitmap.

24. The apparatus claim 21, wherein the encoder produces the output halftone image blocks with a dimension that is different from a corresponding dimension of the respective ones of the contone image blocks.

25. The apparatus of claim 21, wherein the first sequence of graphical code word symbols corresponds to a graphical bar code.

26. The apparatus of claim 21, wherein in producing blocks of an output halftone image the encoder performs operations comprising halftoning the contone image blocks, and determining whether to derive ones of the output halftone image blocks from either respective ones of the contone image blocks or respective ones of the graphical code word symbols based on image intensity levels in the respective ones of the contone image blocks.

27. The apparatus of claim 21, wherein the decoder selects ones of the partitioned halftone image blocks at a rate that is linked to a graylevel of the version of the output halftone image.

28. The apparatus of claim 27, wherein in extracting the information the decoder uses probabilistic analysis to produce a set of probability parameters, uses the set of probability parameters to select a likely sequence of graphical code word symbols encoded into the output halftone image, and converting the selected sequence of graphical code word symbols into the extracted information.

29. A non-transitory computer-readable medium storing computer-readable instructions for causing a computer to perform operations comprising:

determining a bi-level bitmap of bits from a graylevel value, wherein each of the bits has a respective one of either a first value or a second value;

partitioning the contone image into an array of contone image blocks;

generating a sequence of graphical code word symbols encoding information; and producing blocks of an output halftone image from ones of the contone image blocks and ones of the graphical code word symbols in accordance with the values of respective ones of the bits of the bi-level bitmap, wherein ones of the output halftone image blocks associated with respective ones of the bits having the first value are derived from respective ones of the contone image blocks and ones of the output halftone image blocks associated with respective ones of the bits having the second value are derived from respective ones of the graphical code word symbols.

30. The non-transitory computer-readable medium of claim 29, wherein the computer-readable instructions cause the computer to perform operations comprising determining the bitmap based on the graylevel value.

31. The non-transitory computer-readable medium of claim 30, wherein the computer-readable instructions cause the computer to perform operations comprising producing the bitmap by halftoning a contone patch of the graylevel value.

32. The non-transitory computer-readable medium of claim 29, wherein the computer-readable instructions cause the computer to perform operations comprising producing the output halftone image blocks with a dimension that is different from a corresponding dimension of the respective ones of the contone image blocks.

33. The non-transitory computer-readable medium of claim 29, wherein the sequence of graphical code word symbols corresponds to a graphical bar code.

34. The non-transitory computer-readable medium of claim 29, wherein the computer-readable instructions cause the computer to perform operations comprising halftoning the contone image blocks, and determining whether to derive ones of the output halftone image blocks from either respective ones of the contone image blocks or respective ones of the graphical code word symbols based on image intensity levels in the respective ones of the contone image blocks.

35. A non-transitory computer-readable medium storing computer-readable instructions for causing a computer to perform operations comprising:

determining a bi-level bit map of bits from a graylevel value, wherein each of the bits has a respective one of two different values;

partitioning a halftone image into a plurality of partitioned halftone image blocks;

selecting ones of the partitioned halftone image blocks in accordance with the values of respective ones of the bits of the bitmap;

identifying a sequence of graphical code word symbols from the selected ones of the partitioned halftone image blocks; and extracting information from the sequence of graphical code word symbols.

36. The non-transitory computer-readable medium of claim 35, wherein the computer-readable instructions cause the computer to perform operations comprising determining the bitmap based on the graylevel value characterizing the bi-level bitmap.

37. The non-transitory computer-readable medium of claim 35, wherein the computer-readable instructions cause the computer to perform operations comprising determining which of the image blocks to select based on image intensity levels of the image blocks.

38. The non-transitory computer-readable medium of claim 35, wherein the computer-readable instructions cause the computer to perform operations comprising using probabilistic analysis to produce a set of probability parameters, using the set of probability parameters to select a likely sequence of graphical code word symbols encoded into the halftone image, and converting the selected sequence of graphical code word symbols into the extracted information.

* * * * *

UNITED STATES PATENT AND TRADEMARK OFFICE
CERTIFICATE OF CORRECTION

PATENT NO. : 8,363,282 B2  
APPLICATION NO. : 10/698899  
DATED : January 29, 2013  
INVENTOR(S) : Niranjan Damera-Venkata It is certified that error appears in the above-identified patent and that said Letters Patent is hereby corrected as shown below:

In the Claims:  
In column 9, line 25, in Claim 24, delete "apparatus claim" and insert -- apparatus of claim --, therefor.

Signed and Sealed this  
Seventh Day of May, 2013

Teresa Stanek Rea  
*Acting Director of the United States Patent and Trademark Office*